United States Patent [19]

Ibamoto et al.

[11] 4,079,270

[45] Mar. 14, 1978

[54] GATE CONTROL APPARATUS

[75] Inventors: Masahiko Ibamoto; Masato Suzuki; Sigeru Kuriyama, all of Katsuta, Japan

[73] Assignee: Hitachi, Ltd., Japan

[21] Appl. No.: 681,248

[22] Filed: Apr. 28, 1976

[30] Foreign Application Priority Data

May 12, 1975 Japan ................................. 50-54588

[51] Int. Cl.² .......................................... H03K 17/60
[52] U.S. Cl. ............................... 307/252 M; 307/240
[58] Field of Search ................ 307/252 M, 240, 262, 307/268; 328/74; 321/43, 44, 45 C

[56] References Cited

U.S. PATENT DOCUMENTS 3,747,000   7/1973   McIver ............................... 307/240

FOREIGN PATENT DOCUMENTS 1,143,642   2/1969   United Kingdom ................. 307/261

Primary Examiner—Stanley D. Miller, Jr.
Assistant Examiner—Marcus S. Rasco
Attorney, Agent, or Firm—Craig & Antonelli

[57] ABSTRACT

In a semiconductor device which includes a main thyristor and an auxiliary thyristor for turning off the main thyristor and controls conduction period of the main thyristor according to a given duty factor, a gate control apparatus comprising a phase shifter for producing a square wave output corresponding to the duty factor, an integrator for integrating the output of the phase shifter, a relay circuit having two level settings and receiving the output from the integrator to produce an output which exhibits a hysterisis characteristic corresponding to the two level settings, and an amplifier for turning on the main thyristor in response to the output from the relay circuit and turning on the auxiliary thyristor upon the termination of the output from the relay circuit.

9 Claims, 10 Drawing Figures

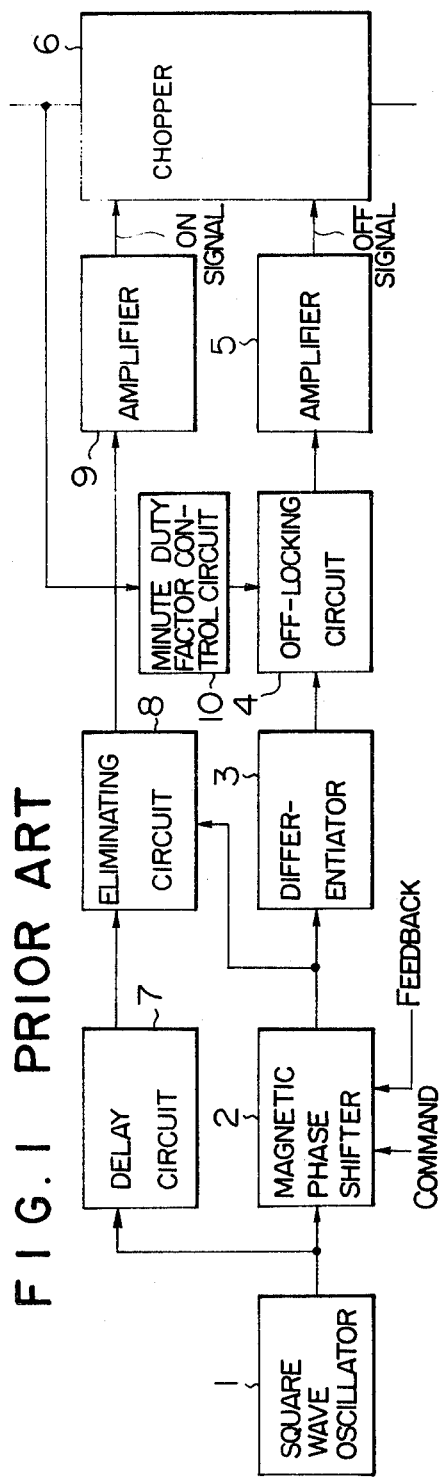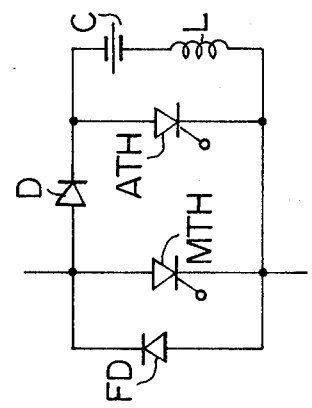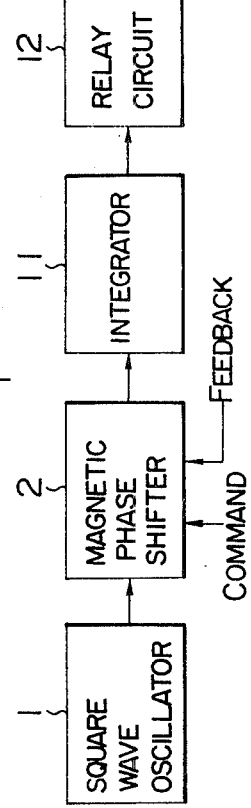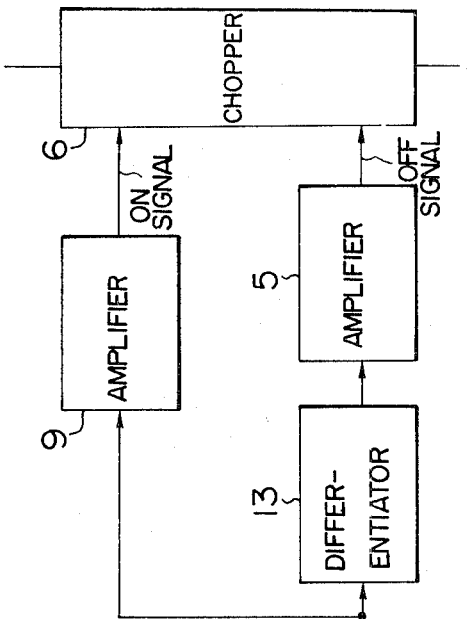

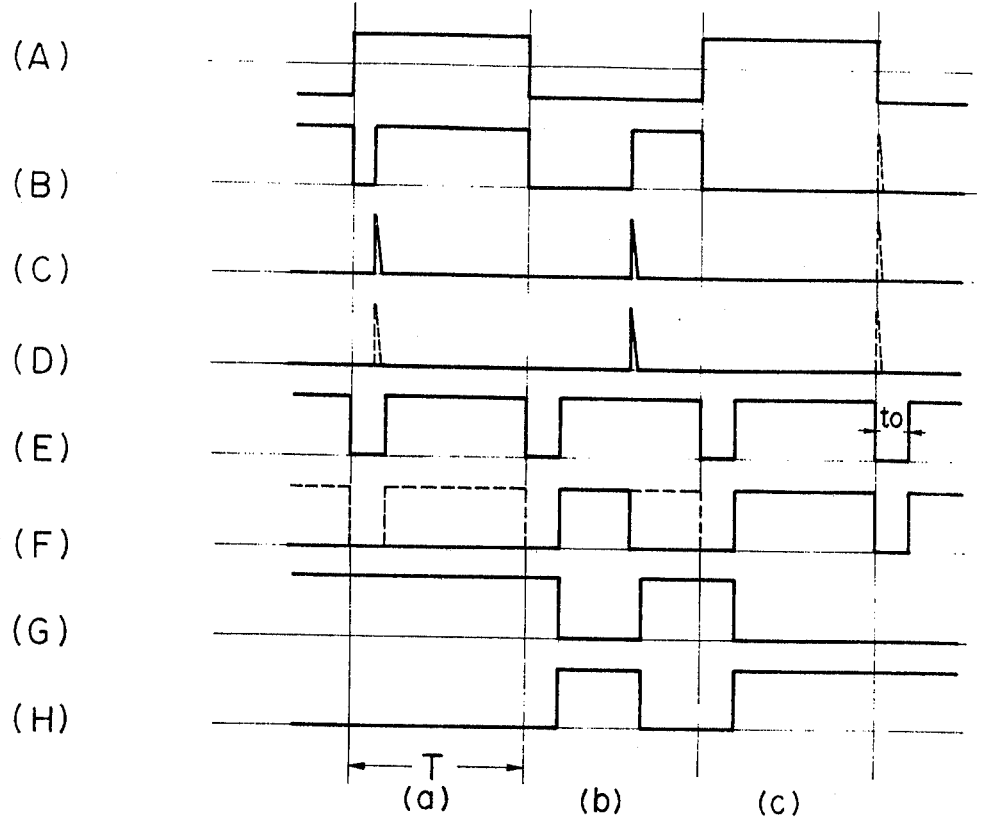
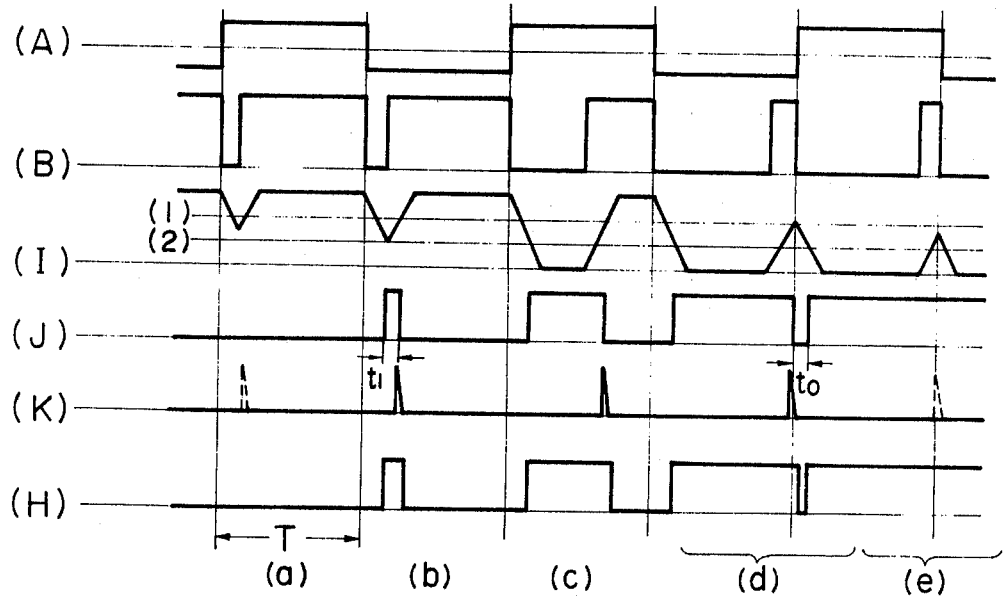

GATE CONTROL APPARATUS

The present invention relates to a control of a semiconductor device, and more particularly to a gate control apparatus for controlling conduction period of the semiconductor device.

As a device whose conduction is controlled by a gate signal, there has been known a thyristor device having a forced turn-off circuit, and as an apparatus using such a thyristor device, there have been known a force commutation inverter, a chopper circuit and the like.

Gate control apparatus have also been known to comprise a fully transistorized system using unijunction transistors for phase control and a magnetic phase-shift system for magnetically effecting phase control.

In controlling an electric motor or the like using a chopper, a signal relating to its main circuit current flowing through the chopper is fed back to the gate control apparatus thereby to prevent overcurrent through the main circuit.

In the fully transistorized gate control apparatus, the feedback of a signal relating to the main circuit current is effected through a shunt resistor inserted in the main circuit and by amplifying a small voltage developed across the resistor. In the magnetic phase-shift apparatus, it is effected by applying the main circuit current to a feedback winding of the magnetic phase shifter.

The gate control apparatus which generates a signal (ON signal) for turning on the main thyristor and a signal (OFF signal) for turning on the auxiliary thyristor thereby to forcibly turn off the main thyristor should meet the following requirements:

1. It is necessary to make the time interval between the OFF signal and the next ON signal longer than a commutation period of the thyristor in order to avoid the commutation failure of the thyristor.

2. It is required to suppress the generation of not only the ON signal, but also the OFF signal in order to establish the minimum duty factor of 0%, i.e. zero main current.

3. It is necessary to suppress the occurrence of the OFF signal when the system is to be controlled at a duty factor of almost 100% and the control would possibly produce the OFF signal and the next ON signal with a time interval than commutation period of the thyristor.

The prior art gate control apparatus has been provided with separate circuits which are individually used to achieve the respective requirements. As a result, the entire control system is usually complicated and requires a great number of components, which in turn leads to low reliability and increase of cost.

It is a primary object of the present invention to provide a gate control apparatus which is simple in construction, highly reliable and inexpensive.

According to one aspect of the present invention, there is provided a gate control apparatus for use with a semiconductor device which includes a main thyristor and an auxiliary thyristor for turning off the main thyristor and controls conduction period of the main thyristor according to a given duty factor, the gate control apparatus comprising first means for producing a square wave output corresponding to the duty factor, second means for integrating the output from the first means, third means for receiving the output from the second means to produce an output which exhibits a hysteresis characteristic according to the two predetermined level settings, and fourth means for turning on the main thyristor in response to the output from the third means and turning on auxiliary thyristor upon the termination of the output from the third means.

The foregoing and other objects and features of the present invention will be apparent from the following detailed description of the invention when taken in conjunction with the accompanying drawings, in which:

FIG. 1 is a block diagram of a prior art gate control apparatus;

FIG. 2 shows an example of a main circuit of a chopper;

FIG. 3 shows waveforms for illustrating the operation of the prior art gate control apparatus shown in FIG. 1;

FIG. 4 is a block diagram of one embodiment of a gate control apparatus in accordance with the present invention;

FIG. 5 shows waveforms for illustrating the operation of the gate control apparatus of the present invention shown in FIG. 4;

Figure 6:
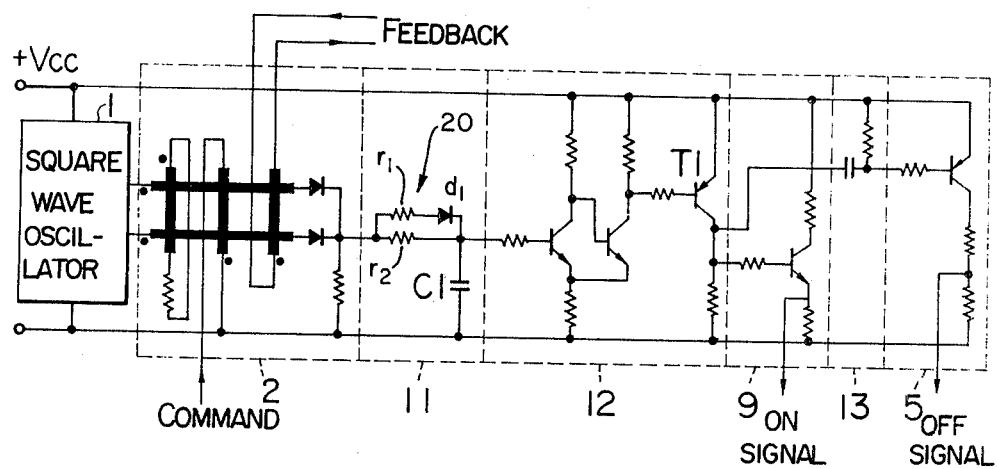
FIG. 6 shows a circuit diagram of another embodiment of the gate control apparatus of the present invention.

Now referring to FIG. 1 which shows a block diagram of a prior art gate control apparatus, it includes a square wave oscillator 1 which serves as an A.C. power supply for a magnetic phase shifter 2 and also serves as an ON signal source, a differentiator circuit 3 for differentiating a leading edge of an output waveform from the magnetic phase shifter 2, an off-locking circuit 4 for erasing an OFF signal when the latter need not be supplied, and an amplifier 5 for amplifying a pulse generated by the leading edge differentiator circuit 3 to produce an OFF signal which in turn is applied to the gate of an auxiliary thyristor ATH of a chopper 6 having a main circuit as shown in FIG. 2. The above-mentioned components constitute an OFF signal circuit.

On the other hand, the output of the square wave oscillator 1 is applied to a delay circuit to produce a delayed square wave whose leading edge is delayed from the leading edge of the non-delayed square wave by a predetermined time period which is larger than the commutation period of the chopper 6. The delayed square wave is applied to an eliminating circuit 8 to eliminate a part of the delayed square wave therefrom which part is determined according to the intended conduction period of the chopper. Then the output of the eliminating circuit is amplified by an amplifier 9 to produce an ON signal which in turn in applied to a gate of a main thyristor MTH of the chopper 6.

A minute duty factor control circuit 10 functions to activate the off locking circuit 4 thereby to suppress the supply of the OFF signal when the chopper 6 is nonconductive. By this circuit the duty factor of the chopper can be controlled from zero.

Referring to FIG. 2, MTH denotes the main thyristor through which a main circuit current flows. ATH denotes the auxiliary thyristor connected in parallel with the main thyristor MTH via a diode D, and functions, together with a commutation capacitor C and a commutation reactor L connected in parallel thereto, a forcibly turn off the main thyristor MTH. FD designates a free wheel diode connected in inverse parallel with the main thyristor MTH. The operation of the circuit of FIG. 2 is well known and hence it will not be necessary to explain in detail.

The operation of the circuit shown in FIG. 1 is now explained with reference to the waveforms shown in FIG. 3.

In FIG. 3, A shows a waveform at the output of the square wave oscillator 1, B shows a waveform at the output of the magnetic phase shifter 2, C shows a waveform at the output of the leading edge differentiator circuit 3, D shows a waveform at the output of the off locking circuit 4, E shows a waveform at the output of the delay circuit 7, F shows a waveform at the output of the eliminating circuit 8, G shows a voltage waveform across the chopper 6, and H shows a current waveform flowing through the chopper 6.

The square wave oscillator 1 generates a square wave voltage having a predetermined period T. The magnetic phase shifter 2 which receives the output of the square wave oscillator functioning as a power supply produces an output having a phase angle which is variable as shown by the waveform B depending on the magnitude of control ampere-turns thereto as command according to the desired conduction period of the chopper. Sections (a), (b) and (c) in FIG. 3 diagramatically illustrate three different states of the phase angle of the output of the magnetic phase shifter which changes from a large angle to a small angle. The leading edge differentiator circuit 3 produces a pulse shown by the waveform C at each leading edge of the output B of the magnetic phase shifter. The output from the delay circuit 7 has a leading edge delayed by a given time period $t_0$ from the leading edge of the square wave voltage, as shown by the waveform E. This is passed through the eliminating circuit 8 to be erased therein by the output waveform B of the magnetic phase shifter to produce an output as shown by the waveform F.

When the output of the magnetic phase shifter assumes a waveform as shown in the section (b), the chopper is turned on by the output F of the eliminating circuit 8 and turned off by the output C of the leading edge differentiator circuit 3 thereby to provide a chopper current as shown by the waveform H.

When the output of the magnetic phase shifter assumes a waveform as shown in the section (a), the output E of the delay circuit is completely erased and the output of the undesired portion elimination circuit 8 is zero. Therefore, no ON signal is generated and the voltage across the chopper is substantially the same as the power source voltage applied thereto. Accordingly, the minute duty factor control circuit 10 detects the source voltage and operates the off-locking circuit 4 to prevent generation of an OFF signal. Thus, the duty factor is controlled to be 0%.

When the output of the magnetic phase shifter assumes a waveform as shown in the section (c), the output C of the leading edge differentiator circuit 3 is also zero, thereby preventing generation of an OFF signal but allowing an ON signal to be generated. Thus, the chopper is operated at 100% duty factor.

When the output of the magnetic phase shifter is almost zero, that is, the duty factor is almost at 100%, the time interval from the leading edge of an OFF signal to a next ON signal is almost $t_0$. Since the time interval $t_0$ is selected to be longer than the commutation period of the chopper, the commutation failure does not occur. This is the reason why the delay circuit 7 is used to delay the ON signal by the time period $t_0$.

As described above, in order to control such a device as the above mentioned chopper which includes a main thyristor and an auxiliary thyristor for forcibly turning off the main thyristor, it is required to meet the above three requirements.

In the control circuit shown in FIG. 1, the delay circuit 7 is provided to satisfy the requirement (1), and the minute duty factor control circuit 10 and the off locking circuit 4 are provided to satisfy the requirement (2). The requirement (3) can be satisfied by producing the ON signal from the delayed square wave whose leading edge is delayed from the leading edge of the original square wave by more than the commutation period of the chopper.

Since the prior art control apparatus includes separate circuits which are exclusively used to satisfy the above requirements, it involves a problem that the entire control circuit is complicated and requires a great number of components, which leads to low reliability and increase of cost.

FIG. 4 shows, in a block diagram form, an embodiment of a gate control apparatus in accordance with the present invention, which overcomes the difficulties encountered in the prior art apparatus and which is simple in construction, highly reliable and inexpensive. FIG. 5 shows waveforms for illustrating the operation thereof.

Referring to FIG. 4, the square wave oscillator 1 serves as a power supply to the magnetic phase shifter 2, which in turn produces an output having a phase angle which is variable, as shown by the waveform B in FIG. 5, depending on the magnitude of control ampereturns applied thereto as command according to the desired conduction period of the chopper. The sections (a) to (e) diagramatically show the outputs of the magnetic phase shifter having different phase angles from a larger one to a smaller one.

In FIG. 5, A shows a waveform at the output of the square wave oscillator 1, B shows a waveform at the output of the magnetic phase shifter 2, I shows waveform at an output of an integrator 11, J shows a waveform at an output of a relay circuit 12, K shows a waveform at an output of a trailing edge differentiator circuit 13, and H shows a waveform of a current flowing through the chopper 6.

The integrator circuit 11 may be formed by a Miller integrator circuit and produces an output as shown by the waveform I in FIG. 5. The one-dot chain lines shown in the waveform I represent operation levels of the relay circuit 12 which may be formed by a Schmitt circuit.

When the waveform I falls below the level (2), the relay circuit produces an output, which continues until the waveform I rises above the level (1). Thus the relay circuit exhibits a hysteresis in its input-to-output characteristic and produces an output as shown in FIG. 5(J).

When the output of the magnetic phase shifter assume a waveform as shown in the section (c), the output of the integrator circuit 11 once falls below the operation level (2) of the relay circuit and then rises above the operation level (1). Thus, the output of the relay circuit produce a pulse waveform which is lagging in overall with respect to and has a wave width controlled by the output of the phase shifter (waveform B in FIG. 5).

The output J of the relay circuit 12 is amplified by the amplifier 9 to produce an ON signal, which is applied to the gate of the main thyristor MTH. The output J of the relay circuit 12 is also applied to the trailing edge differentiator circuit 13 to produce a pulse having a narrow width at the phase of the trailing edge of the waveform J. The pulse is amplified by the amplifier circuit 5 to produce an OFF signal, which is applied to the gate of the auxiliary thyristor ATH of the chopper 6. As a result the current waveform H flows through the chopper 6.

When the output of the magnetic phase shifter assumes a waveform as shown in the section (a), the output I of the integrator circuit is always higher than the operation level (2) of the relay circuit and the relay circuit remains in zero output state. As a result, no ON signal is produced. Accordingly, the output K of the trailing edge differentiator circuit is also zero and no OFF signal is produced. Thus, the duty factor of the chopper 6 is maintained zero.

When the output of the magnetic phase shifter assumes a waveform as shown in the section (e), the output I of the integrator circuit is always lower than the operation level (1) of the relay circuit 12 and the Schmitt circuit remains in output condition. As a result, the ON signal remains in up level while the output K of the differentiator circuit, or the OFF signals is not produced. Thus, the duty factor of the chopper is maintained 100%.

The section (d) in FIG. 5 shows waveforms of the respective outputs produced when the duty factor of the chopper is almost 100%. Because of the gradient of the trailing edge of the output of the integrator circuit and the hysteresis characteristic in operation of the relay circuit, a time interval $t_0$ is provided between the OFF signal and the next ON signal by suitably arranging the circuits, for example, adjusting operation levels for the hysteresis characteristics of the relay circuit, to provide the time interval $t_0$ longer than the commutation period of the chopper 6, the duty factor of 100% can be achieved without commutation failure.

As described above, according to one embodiment of the present invention, the three requirements discussed above for the chopper control can be simultaneously met by the combination of a simple integrator circuit and a relay circuit, and the entire circuit is considerably simplified, which leads to high reliability and cost reduction.

Figure 7:
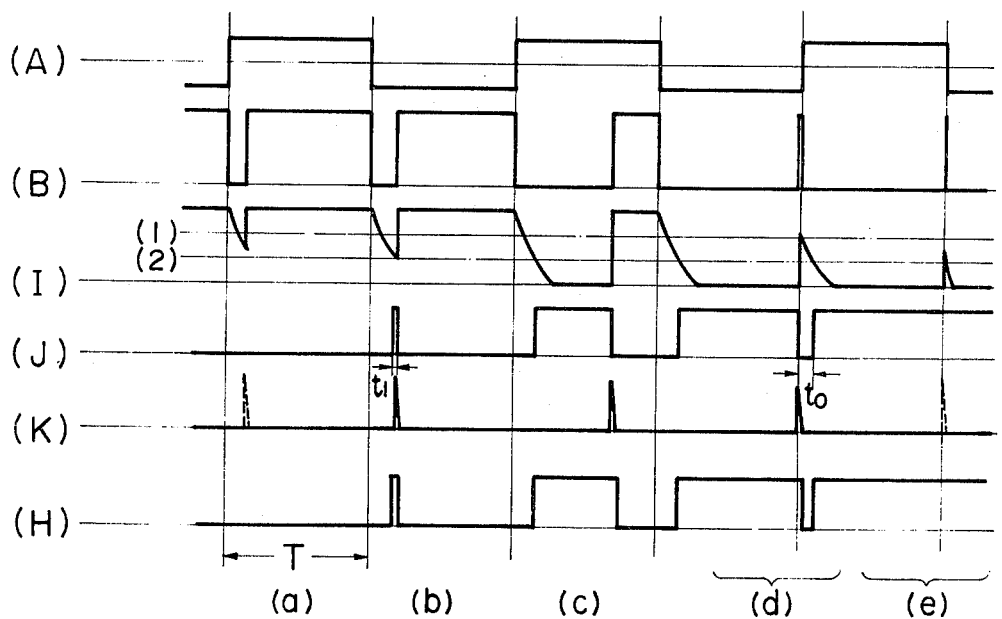
FIG. 7 shows waveforms for illustrating the operation thereof.

FIG. 6 shows a circuit diagram of other embodiment of the gate control apparatus of the present invention and FIG. 7 shows the waveforms for illustrating the operation. The reference symbols used correspond to those in FIGS. 4 and 5. The embodiment of FIG. 6 is different from FIG. 4 in that the resistor circuit 20 for charging and discharging the capacitor $c_1$ of the integrator circuit 11 includes a resistor $r_1$ which is connected through a diode $d_1$ to the capacitor $c_1$ to allow only a charging current to pass therethrough and a resistor $r_2$ which allows both the charging and discharging currents to pass therethrough so that the time constant of the integrator circuit 11 differs at charging from at discharging. In the embodiment of FIG. 4, which will be realized by substantially the same circuit arrangements as FIG. 6 but excluding the series circuit of resistor $r_1$ and diode $d_1$ in the integrator 11 and thereby provides a charging time constant equal to the discharging time constant, the duty factor of the chopper, even when the control is assumed to operate the chopper at a duty factor as small as possible, but not zero, becomes relatively large, such as in the order of 10%, because the pulse width $t_1$ of the ON signal is equal to the commutation period $t_0$ as shown in the section (b) of FIG. 5. On the other hand, in the embodiment of FIG. 6, the duty factor can be reduced to a very small value but not zero as seen from the waveform of FIG. 7. For example, the duty factor of the order of 1% is attainable because the width of the ON signal can be reduced to a much smaller value, such as of the order of 50 $\mu s$, which is almost the minimum value for the ON signal capable of turning on the thyristor.

According to the embodiment of FIG. 6, a particular advantage of smooth control of the chopper is attained because the available minimum duty factor is very small. Especially in a battery powered forklift, the capability of operation at such a small duty factor is an essential factor in view of a driver's comfortable ride on the same because plugging control (braking by reverse energization) is required. In this respect, the present embodiment is considerably advantageous.

Figure 8:
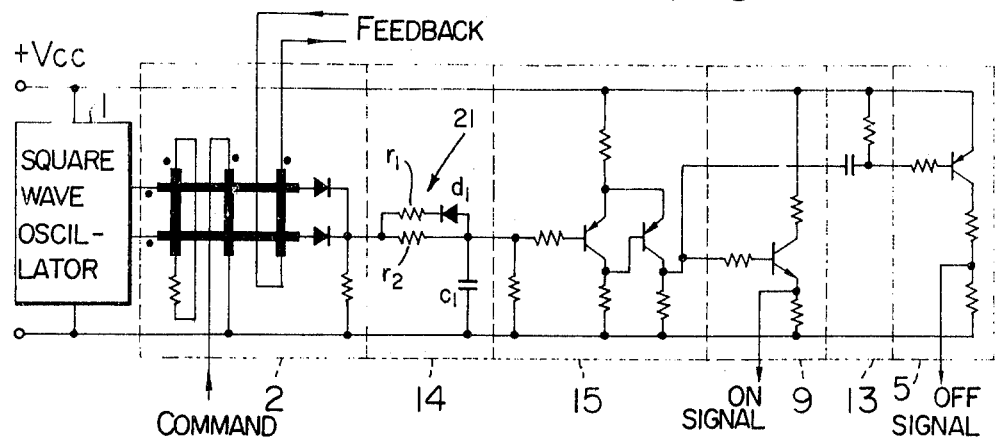
FIG. 8 shows a circuit diagram of a further embodiment of the present invention.
Figure 9:
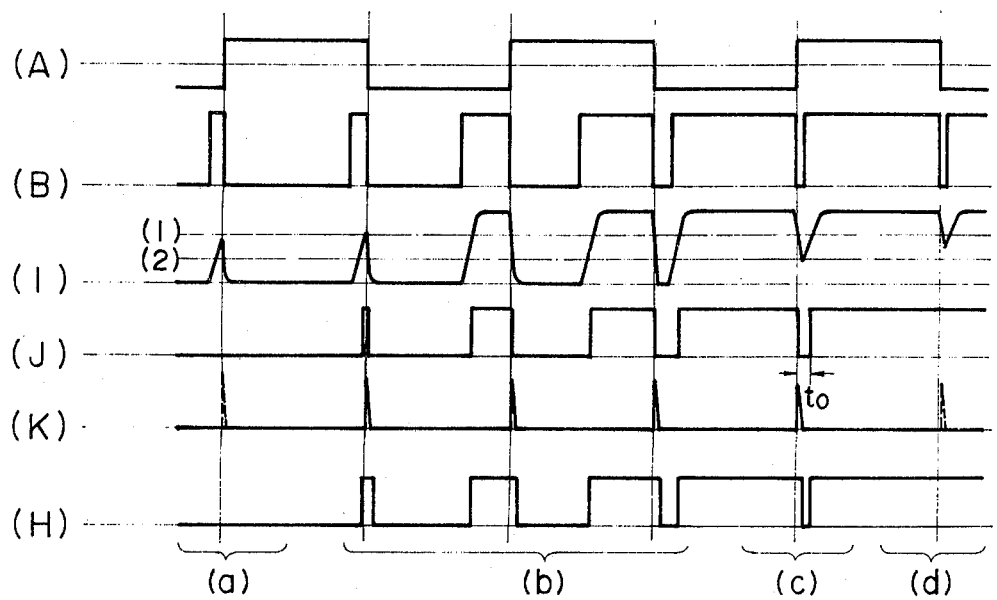
FIG. 9 shows waveforms for illustrating the operation thereof.

FIGS. 8 and 9 illustrate a further embodiment of the present invention. This embodiment is different from FIG. 6 in that the duty factor of the chopper is controlled to be proportional to the phase angle of the magnetic phase shifter.

The output of the magnetic phase shifter 2 which is supplied with the output of the square wave oscillator 1 is shown by the waveform B in FIG. 9. The sections (a) to (d) diagramatically show the change of the phase angle of the magnetic phase shifter from a small angle to a large angle.

The reference symbols used in FIGS. 8 and 9 correspond to those used in FIGS. 6 and 7. Only the configurations of the interior circuit 14 and the relay circuit 15 are different from those of FIGS. 6 and 7. Particularly, the polarity of the diode $d_1$ in the integrator circuit 14 is opposite to that in FIG. 6, and the transistor $T_1$ for polarity inversion has been omitted in the relay circuit 15 of FIG. 8.

The integrator circuit 14 of FIG. 8 includes a resistor circuit 21 for charging and discharging the capacitor $c_1$. In the resistor circuit 21, the diode $d_1$ is connected to the resistor $r_1$ so as to allow only the discharging current of the capacitor $c_1$ to pass therethrough while the resistor $r_2$ allows both the charging and discharging currents to pass therethrough, thereby providing the integrator circuit with a larger charging time constant and a smaller discharging time constant so that the output of the integrator circuit takes a waveform as shown in FIG. 9(I) when it is supplied with the output B of the magnetic phase shifter. The one dot chain lines shown in the waveform I represent the operation levels of the relay circuit 15 as in the case of FIG. 5. In this case, however, the relay circuit 15 produces an output when its input exceeds the operation level (1) and the output continues until the input falls below the operation level (2). Thus, unlike the relay circuit 12 of FIG. 6, there is no need of using an additional transistor such as the transistor $T_1$ in FIG. 6 for inverting the output of the Schmitt circuit.

When the output of the magnetic phase shifter assumes a waveform as shown in the section (b), the output of the integrator 14 once rises above the operation level (1) of the relay circuit and then falls below the operation level (2). Thus the relay circuit 15 produces an output as shown by the waveform J. The output is utilized in the same manner as in FIG. 5 to obtain the ON and OFF signals which in turn control the operation of the chopper 6.

When the output of the magnetic phase shifter assumes a waveform as shown in the section (a), the output I of the integrator circuit is always below the operation level (1) of the relay circuit 15 and the relay circuit 15 remains in its zero output state. Therefore, the duty factor of the chopper is maintained at zero as in the case of FIG. 5.

When the output of the magnetic phase shifter assumes a waveform as shown in the section (d), the output I of the integrator circuit is always above the operation level (2) of the relay circuit 15 and the latter remains in the output state. Thus, the duty factor of the chopper is maintained at 100% as in the case of FIG. 5.

The section (c) of FIG. 9 shows the condition where the duty factor reaches near to 100%. The output of the integrator circuit 14 once falls slightly below the operation level (2) of the relay circuit and immediately rises. By properly selecting the charging time constant of the integrator circuit 14 so that the time interval $t_0$ between the time when the output of the integrator circuit falls below the operation level (2) of the relay circuit and the time when it rises upto the operation level (1) is longer than the commutation period of the chopper 6, the chopper operates without commutation failure even when its operation is shifted to the 100% duty factor.

According to this embodiment, the circuit arrangement can be further simplified because the relay circuit 15 need not include the inverter circuit.

Figure 10:
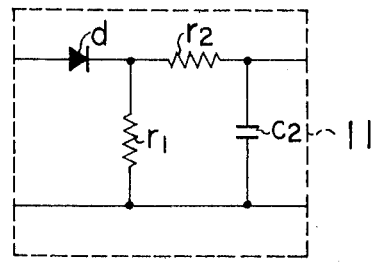
FIG. 10 shows a circuit diagram illustrating other example of an integrator used in the present invention.

It should be understood that, in order to provide different time constants for charging and discharging, the integrator circuit 11 of FIG. 6 may be arranged in the manner as shown in FIG. 10 such that a diode $d$ is connected at its end to the output terminal of the magnetic phase shifter, and at the other end to a resistor $r1$ and a series circuit of a resistor $r2$ and a capacitor $C2$ and the voltage across the capacitor $C2$ is taken out is an output.

While the gate control apparatus using the magnetic phase shifter has been particularly explained hereinabove, it will be understood that the present invention is not limited to an apparatus which uses the magnetic phase shifter.

The present invention can provide a gate control apparatus which is simple in construction, highly reliable and inexpensive.

What we claim is:

1. A gate control apparatus for a semiconductor device having a main thyristor and an auxiliary thyristor for turning off said main thyristor and controlling a conduction period of said main thyristor according to a given duty factor, said gate control apparatus comprising first means for producing a square wave output corresponding to an intended duty factor, second means for integrating the output from said first means, third means for receiving the output from said second means to produce an output which exhibits a hysteresis characteristic according to at least two predetermined level settings, and fourth means for turning on said main thyristor in response to the output from said third means and turning on said auxiliary thyristor upon the termination of the output from said third means and wherein said first means includes an oscillator which produces a square wave voltage and a phase shifter which receives the output of said oscillator to produce an output signal corresponding to said intended duty factor.

2. A gate control apparatus according to claim 1, wherein said second means includes an integrator having a capacitor and a resistor circuit through which said capacitor is charged and discharged.

3. A gate control apparatus according to claim 1, wherein said third means includes a Schmitt circuit.

4. A gate control apparatus for a semiconductor device having a main thyristor and an auxiliary thyristor for turning off said main thyristor and controlling a conduction period of said main thyristor according to a given duty factor, said gate control apparatus comprising first means for producing a square wave output corresponding to an intended duty factor, second means for integrating the output from said first means, third means for receiving the output from said second means to produce an output which exhibits a hysteresis characteristic according to at least two predetermined level settings, and fourth means for turning on said main thyristor in response to the output from said third means and turning on said auxiliary thyristor upon the termination of the output from said third means and wherein said fourth means includes a first amplifier having a transistor which is rendered conductive in response to the output signal from said third means and applying the signal amplified by said transistor to the gate of said main thyristor, a differentiator circuit for producing a differentiated signal at the trailing edge of the output signal from said third means, and a second amplifier having a transistor which is rendered conductive in response to the output signal from said differentiator circuit and applying the signal amplified by said transistor to the gate of said auxiliary thyristor.

5. A gate control apparatus according to claim 1, wherein the square wave output of said first means has a width which is substantially inversely proportional to the intended duty factor.

6. A gate control apparatus according to claim 1, wherein the square wave output of said first means has a width which is substantially proportional to the intended duty factor.

7. A gate control apparatus according to claim 1, wherein said second means includes means for integrating the output of said first means at a first time constant and means for discharging the integrated output of said first means at a second time constant different from said first time constant.

8. A gate control apparatus for a semiconductor device having a main thyristor and an auxiliary thyristor for turning off said main thyristor and controlling a conduction period of said main thyristor according to a given duty factor, said gate control apparatus comprising first means for producing a square wave output corresponding to an intended duty factor, second means for integrating the output from said first means, third means for receiving the output from said second means to produce an output which exhibits a hysteresis characteristic according to at least two predetermined level settings, and fourth means for turning on said main thyristor in response to the output from said third means and turning on said auxiliary thyristor upon the termination of the output from said third means, said second means including an integrator having a capacitor and a resistor circuit through which said capacitor is charged and discharged, said resistor circuit providing a first resistance value when said capacitor is charged and providing a second different resistance value when said capacitor is discharged.

9. A gate control apparatus according to claim 1, said phase shifter being a magnetic phase shifter.

* * * * *